(12) United States Patent
Chang

(10) Patent No.: US 6,463,840 B1
(45) Date of Patent: Oct. 15, 2002

(54) BLADE ADJUSTING DEVICE FOR STRING SAW

(76) Inventor: Chin-Chin Chang, No. 122, Lane 967, San Feng Road, Feng Yuan, Taichung Hsien (TW)

(*) Notice: Subject to any disclaimer, the term of this patent is extended or adjusted under 35 U.S.C. 154(b) by 30 days.

(21) Appl. No.: 09/713,402

(22) Filed: Nov. 15, 2000

(51) Int. Cl.⁷ .................................................. B27B 3/00
(52) U.S. Cl. ...................... 83/783; 83/699.21; 83/581.1
(58) Field of Search ........................... 83/699.21, 581.1, 83/783–786

(56) References Cited

U.S. PATENT DOCUMENTS

| | | | |
|---|---|---|---|
| 138,808 A | * 5/1873 | Lawrence | 83/699.21 |
| 332,391 A | * 12/1885 | Goodell | 30/513 |
| 4,681,006 A | * 7/1987 | Miller | 83/581.1 |
| 5,327,807 A | * 7/1994 | Chang | 83/581.1 |
| 5,363,733 A | * 11/1994 | Baird et al. | 403/DIG. 4 |
| 5,520,081 A | * 5/1996 | Rice et al. | 83/699.21 |
| 5,896,799 A | * 4/1999 | Chen | 83/662 |
| 5,941,153 A | * 8/1999 | Chang | 83/662 |
| 6,105,482 A | * 8/2000 | Garcia et al. | 30/338 |

* cited by examiner

*Primary Examiner*—Kenneth E. Peterson
*Assistant Examiner*—Jason D Prone
(74) *Attorney, Agent, or Firm*—Connolly Bove Lodge & Hutz LLP

(57) ABSTRACT

A blade adjusting device for a string saw includes a suspension arm having a support plate and a pivot chamber, a pivot arm having a first end pivotally mounted in the pivot chamber of the suspension arm and a second end defining a pivot chamber, a blade clamping base having a first end pivotally mounted in the pivot chamber of the pivot arm and a second end for clamping a blade, a rotary knob rotatably mounted on the blade clamping base for detachably replacing the blade, a washer mounted on the support plate of the suspension arm, an adjusting rod slidably mounted in the suspension arm and in turn extending through the washer, the support plate of the suspension arm, and the pivot arm, a press handle having a first end pivotally mounted on an upper end of the adjusting rod and rotatably urged on the washer, and an adjusting knob rotatably screwed on a lower end of the adjusting rod and urged on the pivot arm.

5 Claims, 4 Drawing Sheets

BLADE ADJUSTING DEVICE FOR STRING SAW

BACKGROUND OF THE INVENTION

1. Field of the Invention

The present invention relates to a blade adjusting device, and more particularly to a blade adjusting device for a string saw.

2. Description of the Invention

A conventional blade adjusting device for a string saw in accordance with the prior art comprises an upper suspension arm, and a lower suspension arm whereby the distance between the upper suspension arm and the lower suspension arm can be adjusted so as to adjust the tightness of the blade of the string saw.

However, the blade of the string saw is easily subjected to a violent vibration during the cutting process of the string saw which is operated at a high speed so that the distance between the upper suspension arm and the lower suspension arm is easily changed and deviated, thereby greatly affecting the tightness of the blade, and thereby decreasing the working efficiency of the string saw.

SUMMARY OF THE INVENTION

The present invention has arisen to mitigate and/or obviate the disadvantage of the conventional blade adjusting device for a string saw.

In accordance with one aspect of the present invention, there is provided a blade adjusting device for a string saw comprising:

- a suspension arm having a first end provided with a support plate and defining a pivot chamber located in the support plate;
- a pivot arm pivotally mounted in the pivot chamber of the suspension arm and having a first end pivotally mounted on the first end of the suspension arm and a second end defining a pivot chamber;
- a blade clamping base having a first end pivotally mounted in the pivot chamber of the pivot arm and a second end for clamping a blade;
- a rotary knob rotatably mounted on the blade clamping base for detachably replacing the blade;
- a washer mounted on the support plate of the suspension arm;
- an adjusting rod slidably mounted in the suspension arm and in turn extending through the washer, the support plate of the suspension arm, and the pivot arm;
- a press handle having a first end pivotally mounted on a first end of the adjusting rod and rotatably urged on the washer; and
- an adjusting knob rotatably screwed on a second end of the adjusting rod and urged on the pivot arm.

Further benefits and advantages of the present invention will become apparent after a careful reading of the detailed description with appropriate reference to the accompanying drawings.

DETAILED DESCRIPTION OF THE INVENTION

Figure 1:
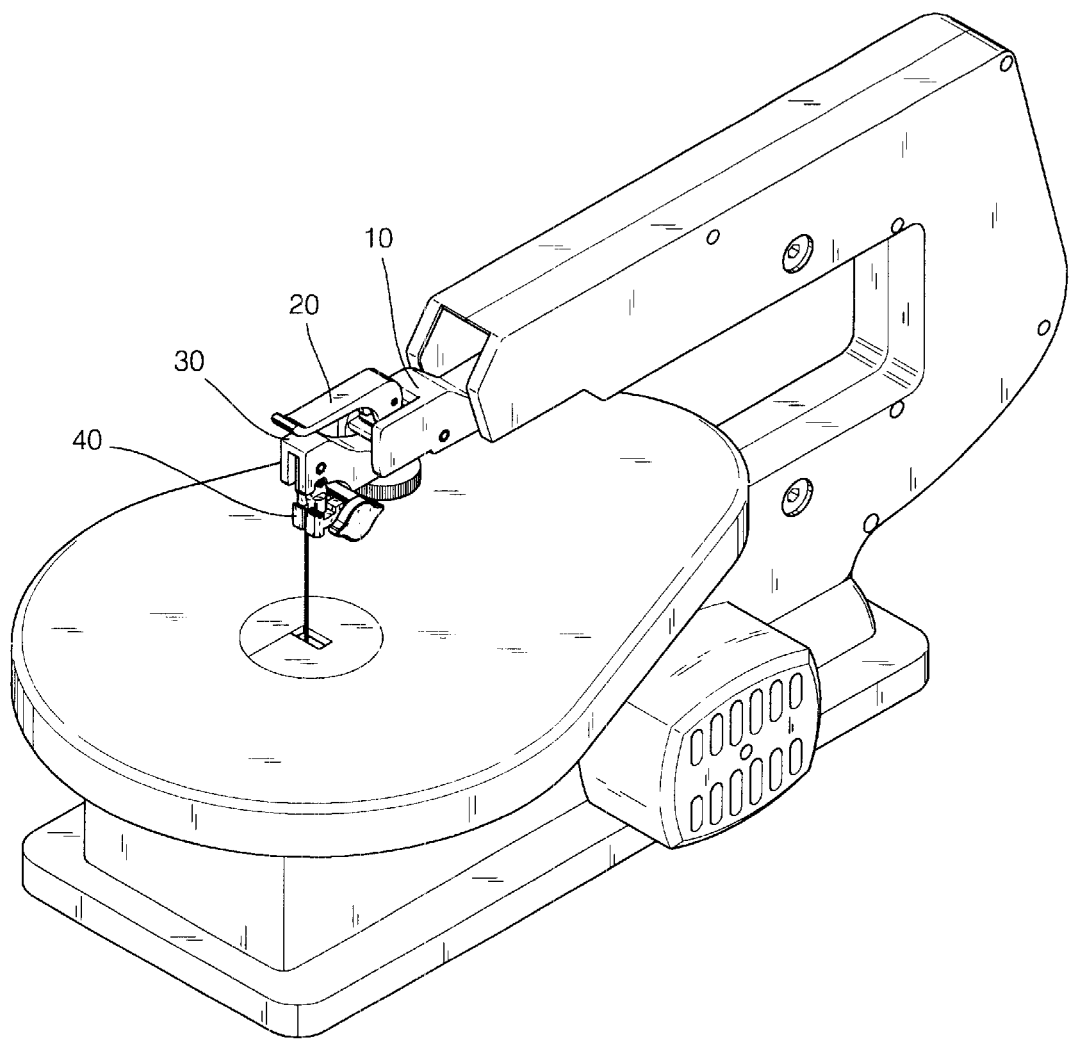
FIG. 1 is a perspective view of a blade adjusting device for a string saw in accordance with the present invention.
Figure 2:
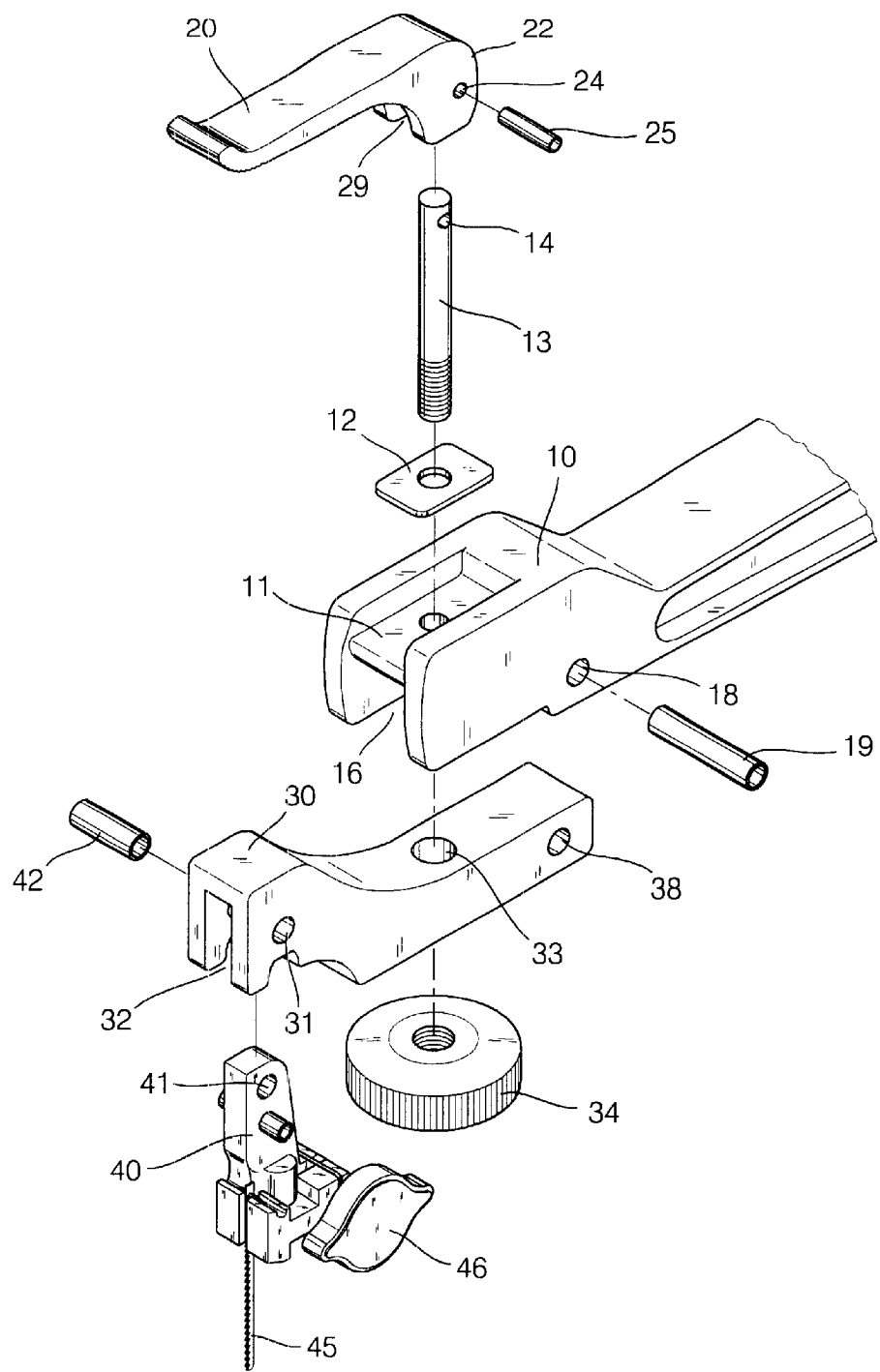
FIG. 2 is an exploded view of the blade adjusting device for a string saw as shown in FIG. 1.

Referring to FIGS. 1–5, a blade adjusting device for a string saw in accordance with the present invention comprises a suspension arm 10, a press handle 20, a pivot arm 30, and a blade clamping base 40.

The suspension arm 10 has a front end provided with a support plate 11 and defining a pivot chamber 16 located under the support plate 11. A washer 12 is mounted on the support plate 11 of the suspension arm 10.

The pivot arm 30 is pivotally mounted in the pivot chamber 16 of the suspension arm 10 and has a rear end pivotally mounted on the front end of the suspension arm 10 and a front end defining a pivot chamber 32.

The blade clamping base 40 has an upper end pivotally mounted in the pivot chamber 32 of the pivot arm 30 and a lower end for clamping a blade 45. A rotary knob 46 is rotatably mounted on the blade clamping base 40 for detachably replacing the blade 45. The pivot arm 30 is an adjusting member for adjusting the tightness of the blade 45.

An adjusting rod 13 is slidably mounted in the suspension arm 10 and is in turn extended through the washer 12, the support plate 11 of the suspension arm 10, and a circular hole 33 defined in the pivot arm 30. The press handle 20 has a rear end pivotally mounted on the upper end of the adjusting rod 13 and rotatably urged on the washer 12. An adjusting knob 34 is rotatably screwed on the threaded lower end of the adjusting rod 13 and is urged on the pivot arm 30.

The upper end of the adjusting rod 13 defines an axle hole 14, the rear end of the press handle 20 defines a pivot slot 29 for receiving the upper end of the adjusting rod 13 therein, and defines an axle hole 24 communicating with the axle hole 14 of the adjusting rod 13, and the blade adjusting device further comprises a pivot axle 25 extending through the axle hole 24 of the press handle 20 and through the axle hole 14 of the adjusting rod 13 so that the rear end of the press handle 20 is pivotally mounted on the upper end of the adjusting rod 13.

The rear end of the pivot arm 30 defines an axle hole 38, the front end of the suspension arm 10 defines an axle hole 18 communicating with the axle hole 38 of the pivot arm 30, and the blade adjusting device further comprises a pivot axle 19 extending through the axle hole 18 of the suspension arm 10 and through the axle hole 38 of the pivot arm 30 so that the rear end of the pivot arm 30 is pivotally mounted on the front end of the suspension arm 10.

The upper end of the blade clamping base 40 defines an axle hole 41, the front end of the pivot arm 30 defines an axle hole 31 communicating with the axle hole 41 of the blade clamping base 40, and the blade adjusting device further comprises a pivot axle 42 extending through the axle hole 31 of the pivot arm 30 and through the axle hole 41 of the blade clamping base 40 so that the upper end of the blade clamping base 40 is pivotally mounted on the front end of the pivot arm 30.

Figure 3:
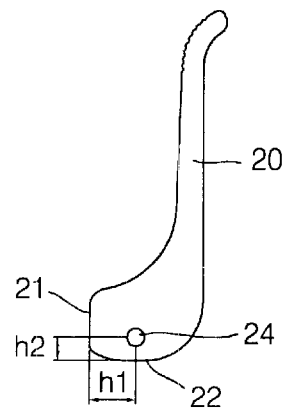
FIG. 3 is a side plan view of a press handle of the blade adjusting device for a string saw as shown in FIG. 2.

As shown in FIG. 3, the rear end of the press handle 20 has a side edge 21 and a bottom edge 22 such that the distance "h1" between the side edge 21 of the rear end of the press handle 20 and the axle hole 24 of the press handle 20 is slightly greater than the distance "h2" between the bottom edge 22 of the rear end of the press handle 20 and the axle hole 24 of the press handle 20.

Figure 5:
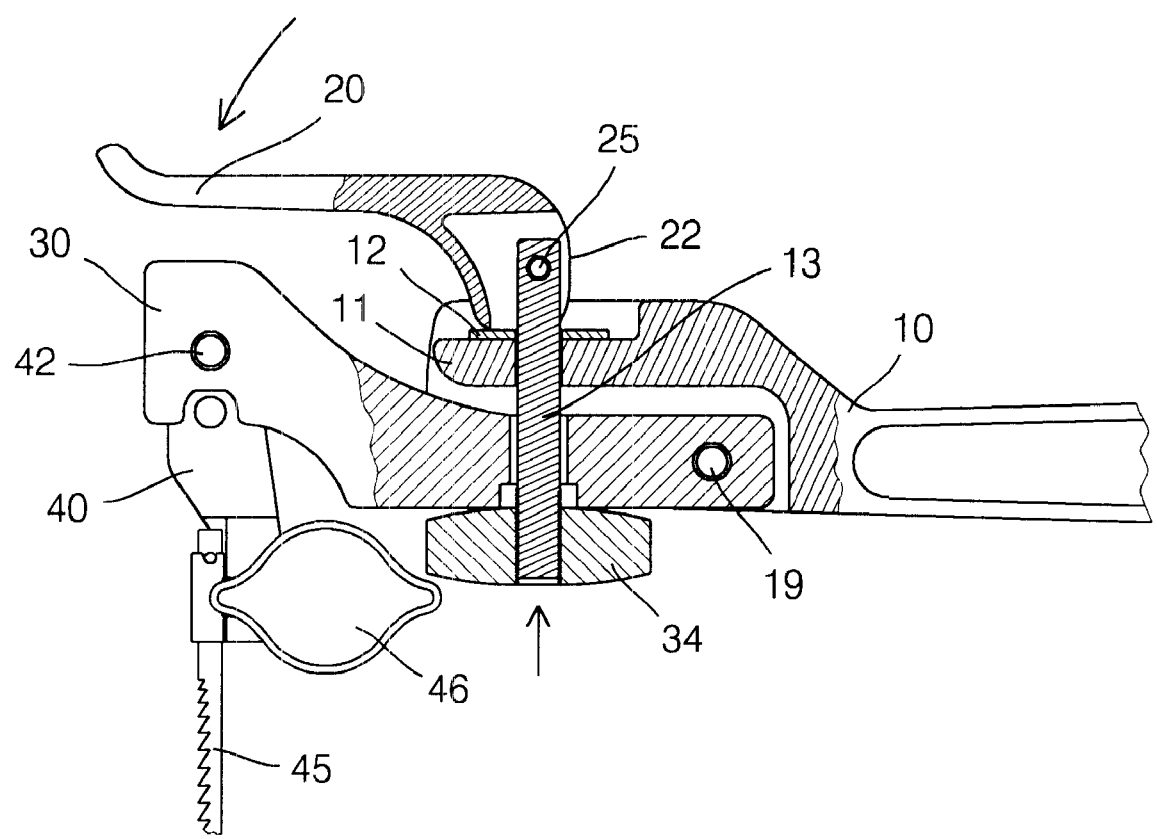
FIG. 5 is an operational view of the blade adjusting device for a string saw as shown in FIG. 4.

In operation, the press handle 20 is initially pressed downward to be pivoted in the direction of the arrow as shown in FIG. 5 so that the side edge 21 of the press handle 20 is urged on the washer 12 to push the adjusting rod 13 and the adjusting knob 34 upward, thereby tightening and locking the pivot arm 30 in the pivot chamber 16 of the suspension arm 10.

Figure 4:
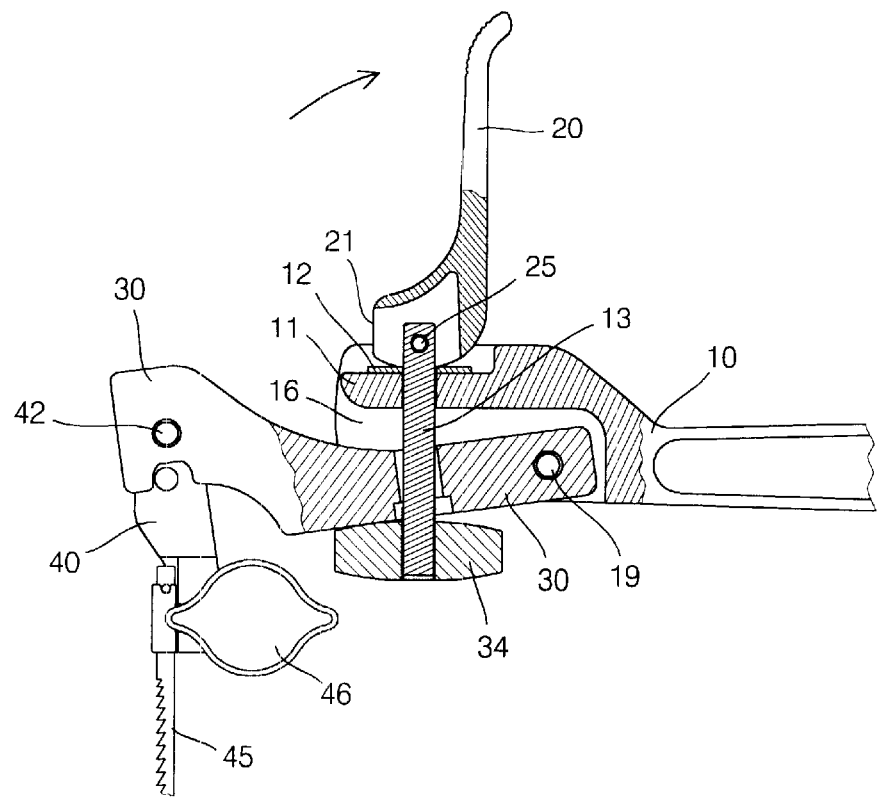
FIG. 4 is a side plan cross-sectional assembly view of the blade adjusting device for a string saw as shown in FIG. 2.

The press handle 20 is then pulled upward to be pivoted in the direction of the arrow as shown in FIG. 4 so that the bottom edge 22 of the press handle 20 is rested on the washer 12 to move the adjusting rod 13 and the adjusting knob 34 downward, thereby loosening and releasing the pivot arm 30 from the pivot chamber 16 of the suspension arm 10 so that the pivot arm 30 can be inclined forward to a proper angular position, thereby facilitating the operator replacing the blade 45 by rotating the rotary knob 46.

Then, the operator can rotate the adjusting knob 34 so as to properly adjust the forward inclined angular position of the pivot arm 30 and the tension strength on the blade 45.

Subsequently, the press handle 20 can again pressed downward to be pivoted in the direction of the arrow as shown in FIG. 5 so that the side edge 21 of the press handle 20 is urged on the washer 12 to push the adjusting rod 13 and the adjusting knob 34 upward, thereby tightening and locking the pivot arm 30 in the pivot chamber 16 of the suspension arm 10.

Accordingly, the pivot arm 30 can be tightened and loosened easily and quickly by means of pivoting the press handle 20 relative to the pivot axle 25 to adjust the distance between the axle 24 of the press handle 20 and the washer 12, thereby moving the adjusting rod 13 and the adjusting knob 34 so as to tighten or loosen the pivot arm 30.

In such a manner, the blade 45 can be replaced easily and quickly. In addition, the pivot arm 30 can be positioned in the pivot chamber 16 of the suspension arm 10 rigidly and stably so that the blade 45 is securely urged and clamped, thereby preventing the blade 45 from becoming loosened and creating noise during the cutting process at a high speed.

It should be clear to those skilled in the art that further embodiments may be made without departing from the scope of the present invention.

What is claimed is:

1. A blade adjusting device for a string saw comprising:
   a suspension arm (10) having a first end provided with a support plate (11) and defining a pivot chamber (16) located in said support plate (11);
   a pivot arm (30) pivotally mounted in said pivot chamber (16) of said suspension arm (10) and having a first end pivotally mounted on said first end of said suspension arm (10) and a second end defining a pivot chamber (32);
   a blade clamping base (40) having a first end pivotally mounted in said pivot chamber (32) of said pivot arm (30) and a second end for clamping a blade (45);
   a rotary knob (46) rotatably mounted on said blade clamping base (40) for detachably replacing said blade (45);
   a washer (12) mounted on said support plate (11) of said suspension arm (10);
   an adjusting rod (13) slidably mounted in said suspension arm (10) and in turn extending through said washer (12), said support plate (11) of said suspension arm (10), and said pivot arm (30), said adjusting rod (13) having a first end protruding outward from said washer (12) and a second end protruding outward from said pivot arm (30);
   a press handle (20) having a first end pivotally mounted on said first end of said adjusting rod (13) and rotatably urged on said washer (12); and
   an adjusting knob (34) rotatably screwed on said second end of said adjusting rod (13) and urged on said pivot arm (30).

2. The blade adjusting device for a string saw in accordance with 24 claim 1, wherein said first end of said adjusting rod (13) defines an axle hole (14), said first end of said press handle (20) defines a pivot slot (29) for receiving said first end of said adjusting rod (13) therein, and defines an axle hole (24) communicating with said axle hole (14) of said adjusting rod (13), and said blade adjusting device further comprises a pivot axle (25) extending through said axle hole (24) of said press handle (20) and through said axle hole (14) of said adjusting rod (13) so that said first end of said press handle (20) is pivotally mounted on said first end of said adjusting rod (13).

3. The blade adjusting device for a string saw in accordance with claim 2, wherein said first end of said press handle (20) has a side edge (21) and a bottom edge (22) such that a distance (h1) between said side edge (21) of said first end of said press handle (20) and said axle hole (24) of said press handle (20) is slightly greater than a distance (h2) between said bottom edge (22) of said first end of said press handle (20) and said axle hole (24) of said press handle (20).

4. The blade adjusting device for a string saw in accordance with claim 1, wherein said first end of said pivot arm (30) defines an axle hole (38), and said first end of said suspension arm (10) defines an axle hole (18) communicating with said axle hole (38) of said pivot arm (30), and said blade adjusting device further comprises a pivot axle (19) extending through said axle hole (18) of said suspension arm (10) and through said axle hole (38) of said pivot arm (30) so that said first end of said pivot arm (30) is pivotally mounted on said first end of said suspension arm (10).

5. The blade adjusting device for a string saw in accordance with claim 1, wherein said first end of said blade clamping base (40) defines an axle hole (41), said second end of said pivot arm (30) defines an axle hole (31) communicating with said axle hole (41) of said blade clamping base (40), and said blade adjusting device further comprises a pivot axle (42) extending through said axle hole (31) of said pivot arm (30) and through said axle hole (41) of said blade clamping base (40) such that said first end of said blade clamping base (40) is pivotally mounted on said second end of said pivot arm (30).

* * * * *